Sept. 22, 1970     D. F. GERMAN     3,529,626
RECIRCULATING HOSE ASSEMBLY
Filed May 31, 1968
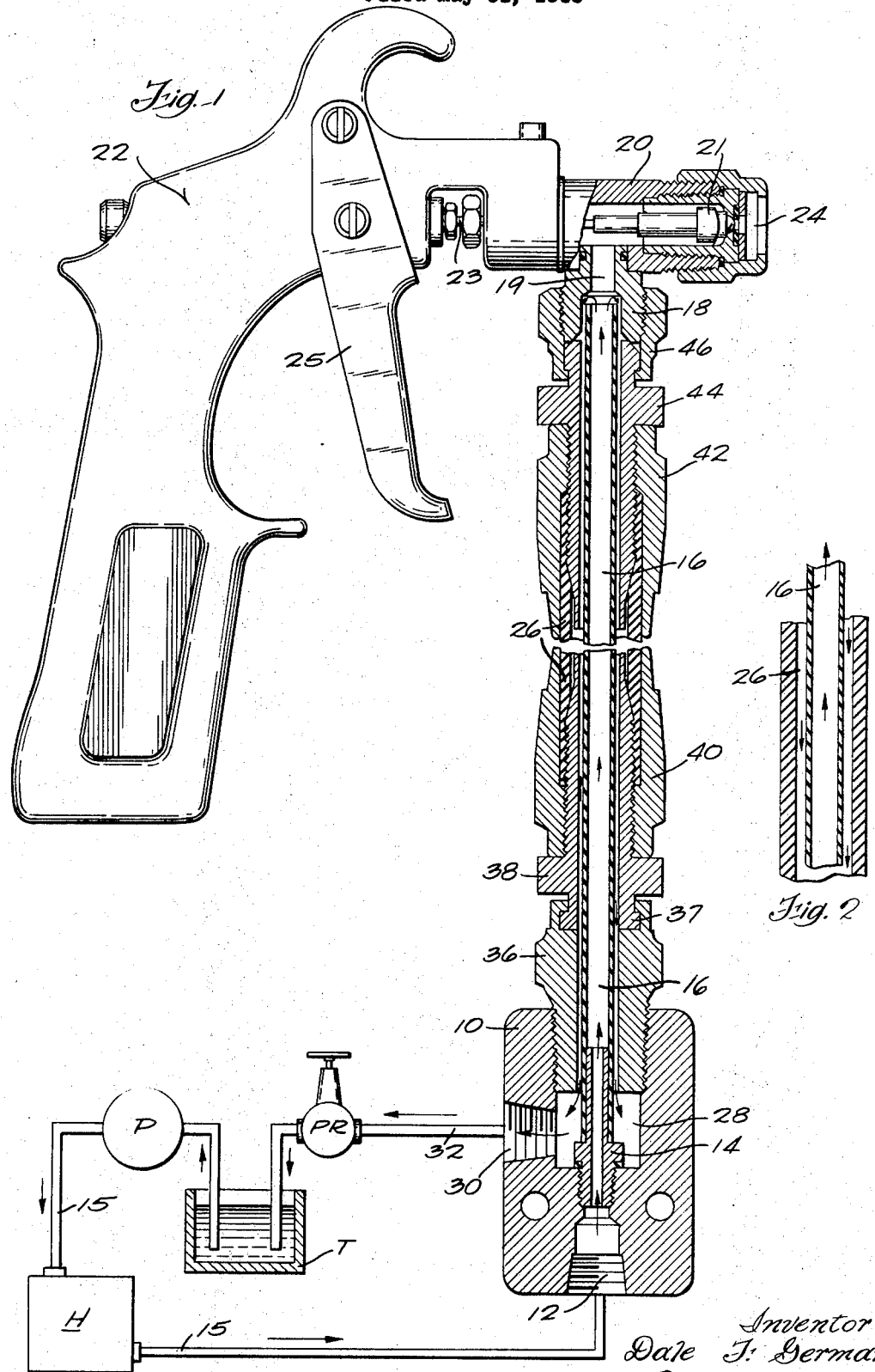
Inventor
Dale F. German
By Bair, Freeman & Molinare
Attorneys

United States Patent Office 3,529,626
Patented Sept. 22, 1970

3,529,626
RECIRCULATING HOSE ASSEMBLY
Dale F. German, Bryan, Ohio, assignor to The Aro Corporation, Bryan, Ohio, a corporation of Delaware
Filed May 31, 1968, Ser. No. 733,623
Int. Cl. B05b 9/00
U.S. Cl. 137—563         3 Claims

ABSTRACT OF THE DISCLOSURE

A host assembly requiring but a single hose connection from a source of supply of fluid under pressure to a fluid using device, and which is so constructed and arranged that recirculation of the fluid under pressure through the hose assembly is accomplished by reason of an inner hose within an outer hose, the inner hose having a smaller external diameter than the internal diameter of the outer hose and terminating adjacent the fluid using device in such manner that fluid under pressure supplied to one hose returns through the other, thus providing for constant recirculation for the purpose of continuous mixing, prevention of sedimentation of pigments, maintenance of the fluid under pressure in a heated condition or the like, in addition to supplying fluid under pressure to the fluid using device.

BACKGROUND OF THE INVENTION

Heretofore recirculating systems for paint guns and the like have been provided in the form of one supply hose leading to the gun and a separate return hose leading from the gun. Such an arrangement is clumsy and bulky, and prevents the use of a swivel connection at the gun.

One object of my present invention is to provide a single hose assembly for interposition between a source of fluid under pressure and a paint gun or other type of fluid using device which has inherent therein means for recirculating the fluid under pressure while causing the recirculated fluid to reach the gun before returning therefrom.

Another object is to provide a recirculating hose assembly in which an outer hose has fittings at its ends, one to receive fluid under pressure and return the fluid, and the other to connect to a paint gun or the like, an inner hose being in communication with a chamber in the first fitting and its other end terminating short of an outlet passage in the other fitting so that one hose may be used for supplying fluid under pressure and the other for return thereof from a point adjacent the paint gun, the inner and outer hoses, due to the arrangement disclosed, flexing freely without restriction by reason of the end of the inner hose adjacent the paint gun being arranged to float inside the outer hose.

Still another object is to provide a practical structure for my hose assembly including a fitting having a supply chamber and a return chamber, with a flexible supply hose having one end thereof hydraulically connected with the supply chamber and a flexible return hose having one end thereof hydraulically connected with the return chamber, one hose being disposed within the other, and the other ends of the hoses being in communication with each other for fluid recirculation purposes.

A further object is to provide means at the upper ends of the hoses for connecting them in communication with a fluid using device whereby fluid from the supply hose will supply the requirements of the fluid using device, and fluid in excess of such requirements will return through the return hose to the return chamber.

Still a further object is to provide a recirculating hose assembly suitable for use in connection with heated fluids, fluids with particles in suspension therein, and the like to efficiently recirculate the fluid in a continuous manner while supplying the needs of a fluid using device without the necessity of having to provide separate supply and return hoses for the fluid using device.

An additional object is to provide a hose assembly which permits the use of a swivel connection for freedom of manipulation of the fluid using device without restriction by the hose assembly.

BRIEF SUMMARY OF THE INVENTION

A fitting having a supply chamber and a return chamber has a pair of hoses, one within the other, connected with the respective chambers and their outer ends associated with a fitting leading to a fluid using device in such manner that fluid under pressure fed to one hose returns through the other except for a portion thereof that is fed to the fluid device to suit its requirements.

BRIEF DESCRIPTION OF THE DRAWINGS

FIG. 1 is a sectional view through my recirculating hose assembly showing one end thereof connected with a paint gun or the like and illustrating diagrammatically a circuit for fluid under pressure associated with the hose assembly, the central portion thereof being broken away to conserve space on the drawing.

FIG. 2 is a sectional view of the central portion of the hose assembly in FIG. 1.

DESCRIPTION OF THE PREFERRED EMBODIMENT

A fitting 10 is illustrated having an inlet 12 for fluid under pressure and an outlet nipple 14 through which the fluid flows as indicated by an arrow adjacent the bottom of FIG. 1. A supply pipe 15 is illustrated for supplying fluid under pressure as from a pump P, the fluid being illustrated in a tank T. The fluid may or may not be heated. FIG. 1 illustrates a heater H for the fluid to be used or not as required depending on the fluid being used.

A supply hose 16 has its lower end in hydraulic communication with the nipple 14 and extends upwardly through fittings 36, 38, 40, 42, 44 and 46 into a fitting 18, its external diameter being smaller than the internal diameter of the fitting 18 and its upper end terminating adjacent a relatively short passageway 19 in the fitting 18 which is connected as by brazing or the like to the barrell 20 of a paint gun or the like generally at 22. A discharge nozzle 24 is also illustrated, together with a control valve 21 having a valve stem 23 actuated by a trigger 25 in the usual manner. The paint gun 22 is merely representative of a device for using fluid under pressure where recirculation of the fluid is desired, and with which my recirculating hose assembly can be used. Other examples are lubricant guns, steam spray nozzles for engine cleaning or the like, etc.

The fitting 36 is screwed into the fitting 10 and the fitting 38 may have a swivel connection 37 with the fitting 36 to facilitate handling of the gun 22 as will hereinafter appear. The fittings 38 and 40 are screwed together in such manner as to clamp the lower end of a return hose 26 in fluid communication with the fitting 38 and likewise the fittings 42 and 44 are screwed together to confine the upper end of the hose 26 and afford communication between it and the fitting 44. The supply hose 16 it will be noted as shown particularly in FIG. 2 is of smaller outside diameter than the inside diameter of the return hose 26 to permit the flow of fluid as illustrated, from the inlet or supply chamber 12 of the fitting 10 through the nipple 14 and the hose 16, and then return from the fitting 18 through the fitting 44, the hose 26 and the fittings 38 and 36 to a return chamber 28 in the fitting 10 and a return outlet 30 thereof. A return pipe 32 is illustrated in communication with the return outlet 30 and has a pressure reducing valve PR therein whereby upon constant operation of the pump P there will be constant flow and recirculation of fluid according to the arrows on the drawing with the pressure thereof regulated by the setting of the pressure reducing valve PR.

At the same time the fluid under pressure is supplied to the gun 22 according to its requirements and at the pressure set by the pressure reducing valve. Whenever the control valve 21 is opened the fluid will be discharged from the nozzle 24, and because of the recirculating feature the user of the gun is assured that, in the case of fluid which is to be heated, there will always be a uniform supply of hot fluid for discharge from the gun. In the case of paint or other liquid where pigment or the like might have a tendency to settle, recirculation as disclosed prevents such settling and provides a constant supply of properly pigmented fluid instantly available at the paint gun.

The particular design disclosed utilizing the special fitting 10 with supply and return chambers and the proper communication with the two hoses provides, in combination with an inner hose that ends floating inside the outer hose, an arrangement that eliminates the necessity of a separate hose for the return line. Also, my recirculating hose assembly is suitable for swivel connections such as shown at 37, which in the case of using two separate hoses, one supply and one return, could not accomplish proper functioning of swivel connections because the hoses would become tangled. My assembly is therefore particularly adapted for swivel connections which may be located at either end of the hose assembly.

I claim as my invention:

1. In a paint gun assembly of the type including a paint gun, a source of heated paint supply and means for recirculating the heated paint between said supply and said gun, the improvement to said means for recirculating of a recirculating hose assembly comprising in combination:

a fitting having a supply chamber connected with said source and a return chamber connected for paint return to said source, an external flexible return hose having a first end and a second end, said first end hydraulically communicating with said return chamber, an internal flexible supply hose disposed within said return hose having a first end and a second end, said first end hydraulically communicating with said supply chamber, and means for regulating fluid pressure of said paint to a predetermined value at said return chamber, fitting means for continuously connecting the second end of said supply hose with the second end of said return hose and for connecting the second end of both hoses with said paint gun such that fluid from said supply hose will continuously supply the requirements of said paint gun and paint in excess of said requirements will be returned through said return hose to said return chamber for recirculation.

2. The improvement of claim 1 wherein said second end of said internal supply hose is floatingly mounted within said external return hose.

3. The improvement of claim 1 wherein a swivel connection is provided at one end of said recirculating hose assembly.

References Cited

UNITED STATES PATENTS

| | | | |
|---|---|---|---|
| 1,843,157 | 2/1932 | Howe | 137—563 X |
| 2,022,481 | 11/1935 | Schellenger | 137—563 |
| 2,645,524 | 7/1953 | Kelly | 137—563 |
| 3,096,103 | 7/1963 | Murphy | 285—134 |

M. CARY NELSON, Primary Examiner

R. B. ROTHMAN, Assistant Examiner

U.S. Cl. X.R.

239—124